Aug. 7, 1962 — W. F. SEIBERT — 3,047,959
GAGING DEVICE
Filed March 24, 1959
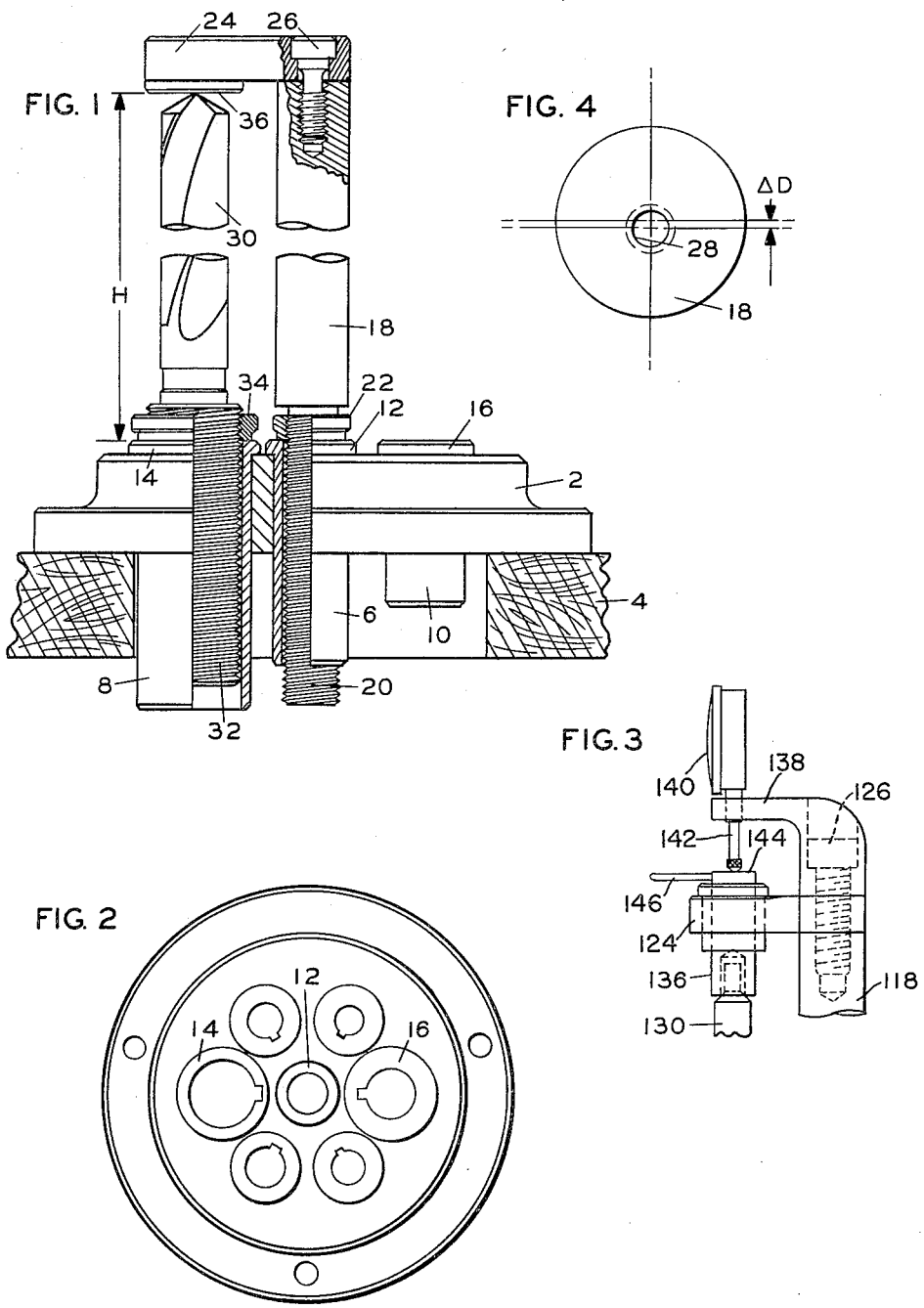
INVENTOR:
WARREN F. SEIBERT
BY John F. Schmidt

3,047,959
GAGING DEVICE
Warren F. Seibert, Chenoa, Ill.
Filed Mar. 24, 1959, Ser. No. 801,472
8 Claims. (Cl. 33—185)

This invention relates to gaging devices, and particularly to a gaging device for pre-set tools.

Modern production techniques, with the requirement of uniformity attendant upon mass production, have put a premium on gaging methods. The rapid advances in production by automation have served only to emphasize the importance of gaging. Production machines operate through a large number of cycles with minimal attention by an operator.

However, even with vastly improved cutting tool alloys, tools still wear out, or cutting edges become dulled to the point that any tool must eventually be replaced by a sharp tool, and the replaced tool must be re-ground to restore it to operative efficiency.

Throughout the many cycles of tool replacement, it is necessary that quality standards be maintained. The replaced tool must perform its function according to specifications as did the tool which it replaces, and within very close limits. The maintenance of quality standards places a high premium on gaging, both on tools and techniques. Whereas older production methods require a high degree of skill in machine tool operators, automation requires considerable skill in the operators who prepare the machine tools for their automatically repeated cutting operations.

Gaging is expensive in that it requires considerable skill by the operator, and in that the equipment involved is expensive. It is accordingly an object of this invention to provide a gaging device for pre-set tools which permits a substantial saving in operating costs by permitting a considerable reduction in the quantity of equipment required without sacrificing quality in the manufactured product, and by enabling an operator to perform a number of gaging operations in conisderably less time than with conventional equipment.

In the drawings:

FIG. 1 is a side elevation view, with parts broken away and in section, of a gaging device made according to this invention.

FIG. 2 is a top plan view of the gage plate shown in FIG. 1.

FIG. 3 is a partial view of a gaging device embodying the invention, being a view similar to that of FIG. 1 but showng a different tool and a different gage head; and FIG. 4 is a top plan view of a gage bar with the gage head removed, showing the eccentricity of the tapped hole in the gage bar.

Referring now to the drawings in detail, a gage plate is shown at 2, mounted in any suitable manner, as for example on a work bench 4. Plate 2 is provided with a circular cylindrical opening in which there is preferably placed a bushing 6. A plurality of openings surround the central opening and they, too, are preferably provided with bushings such as those shown at 8 and 10. The bushings are provided at their upper ends with flanges or collars 12, 14, and 16.

A gage bar 18 is provided with a threaded shank 20, and a stop 22 in the form of a nut is internally threaded and cooperates with the threaded shank 20 to provide an adjustable stop for the gage bar to vary the height of the gage bar above a given reference plane. This plane may be taken as a plane that is tangent to the tops of collars 12, 14, and 16. It will be understood by those skilled in the art that the thickness of the flanges or collars relative to each other will be accurately controlled to within a few ten thousandths of an inch—preferably .0002 inch. A preferred method of achieving such accuracy is to finish-grind the collars with the bushings in place in their openings in the plate, in which case those particular bushings are sold with the specific plate.

A gage head 24 is secured to the upper end of bar 18 by means of a cap screw 26 which passes through a stepped bore in the gage head and engages a tapped hole 28 in the upper end of the gage bar. In the preferred embodiment of the invention, the hole 28 is slightly eccentric to the geometric axis of the portion 20 of the gage bar. This eccentricity is shown somewhat exaggerated at ΔD in FIG. 4. In actual practise, a value of 1/32 inch has been found to give entirely satisfactory results.

The pre-set tool shown in FIG. 1 is a drill 30. Drill 30 may be a conventional drill held in an externally threaded shank 32. A threaded collar 34 is provided on shank 32. Adjustment of collar 34 enables the operator to "pre-set" the dimension H to the desired gage distance.

For a tool like drill 30, gage head 24 is provided with a plane surface 36 which is parallel to the plane of the upper faces of the collars 12, 14 and 16. It will be appreciated by those skilled in the art that the location of the gaging surface 36 relative to the center of plate 2 is not critical. However, FIG. 3 shows a type of tool which presents different gaging problems.

In the case of a tool like the one shown at 130 in FIG. 3, in which the distance of a shoulder from a given plane must be gaged, it is evident that the gage 136 must be aligned with the shoulder axis, and to accomplish this, means are provided to vary the orientation of the gage head with respect to a reference point, which is the center of the gage bar as seen in FIG. 4. It is to permit small variations in the distance of the shoulder axis from the axis of bar 118 that the gage bar 118 is provided with an eccentric hole like that shown at 28 in bar 18. An eccentricity of 1/32 inch permits a variation of 1/16 inch in the distance of the shoulder axis from the gage bar axis without requiring holding the distances between centers of bushings 8 and 6 to extremely close limits.

In FIG. 3, gage head 124 is provided with an arm 138 on which is mounted a dial indicator 140 with its movable feeler 142 extending toward the upper surface 144 of gage 136. A handle 146 on gage 136 enables an operator to lift the gage to permit angular movement of the gage relative to tool 130.

Operation

The distance H is established by adjustment of collar 22 on shank 20. The operator is then able to pre-set any number of newly-ground tools such as drill 30 by placing each tool and shank in bushing 8 and adjusting collar 34 until the tip or end of the tool contacts the gage surface 36. Each tool which is thus pre-set may be stored until it is required to replace a worn tool.

In the case of a tool like the one shown at 130 in FIG. 3, the distance between tool and gage bar centers is adjusted or varied within the limits of 2ΔD by loosening screw 126 and turning the gage bar, with the gage 136 in gaging position on a properly set tool 130, until the operator feels the gage centered with respect to the tool. He then tightens screw 126 and is ready to pre-set tools of that type.

Although FIG. 1 shows only one tool in a bushing of plate 2, it will be apparent to those skilled in the art that the plate can accommodate several tools at one time. It will be further apparent that this invention provides a simplified and much less expensive means to pre-set production tools.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A gaging device for pre-set tools comprising a horizontal plate having a first opening and a second opening, means associated with the plate and providing a reference plane, a gage bar having a threaded end adapted to enter the first opening, an adjusting nut on the threaded end adapted to abut against said means to locate the height of the gage bar above said plane, and a gage head co-operable with the gage bar at the end opposite the threaded end, said head being adapted to check a cutting tool disposed in the second opening.

2. A gaging device for pre-set tools comprising a horizontal plate having a first opening and a second opening, bushings in the openings, a gage bar having a threaded end adapted to enter the bushing in the first opening, an adjustable stop on the threaded end in abutting engagement with the upper surface of the bushing to locate the height of the gage bar above the bushing and a gage head cooperable with the gage bar at the end opposite the threaded end, said head being adapted to check a cutting tool disposed in the bushing of the second opening.

3. A device as in claim 2, in which the gage head is secured to the gage bar by means which permit variation of the orientation of the gage head with respect to a reference point on the gage bar.

4. A gaging device for pre-set tools comprising a plate having a circular cylindrical opening and a second opening, means associated with the plate and providing a reference plane, a gage bar having an end adapted to enter the circular cylindrical opening, a stop on the gage bar adjacent the end in the opening abutting against said means and adjustable to vary the height of the gage bar above said plane, a gage head cooperable with the gage bar, said head being adapted to check a cutting tool disposed in the second opening, and threaded means to secure the gage head to the gage bar, including a threaded hole in the gage bar having an axis parallel to and spaced from the cylindrical axis of the circular cylindrical opening, to vary the orientation of the gage head with respect to a reference point on the gage bar.

5. A gaging device for pre-set tools comprising a horizontal plate having a first opening and a second opening, means associated with the plate and providing a reference plane, said second opening adapted to receive a tool to be pre-set, a gage bar having a threaded end adapted to enter the first opening, an adjusting nut on the threaded end adapted to engage the reference plane to locate the height of the gage bar above the reference plane, and a gage head co-operable with the gage bar at the end opposite the threaded end to provide a gaging surface in a plane which is a preselected distance from the reference plane.

6. A device as in claim 5, in which the gage head is secured to the gage bar by means which permit variation of the orientation of the gage head with respect to a reference point on the gage bar.

7. A gaging device for pre-set tools comprising a horizontal plate having a first opening and a second opening, said second opening adapted to receive a tool to be pre-set, bushings in the openings and having upper surfaces providing a reference plane, a gage bar in the bushing in the first opening and extending above the reference plane, an adjustable stop on the gage bar and in engagement with the reference plane, and a gage head co-operable with the gage bar to provide a gaging surface in a plane which is a preselected distance from the reference plane.

8. A gaging device for pre-set tools comprising a plate having a circular cylindrical opening and a second opening, means associated with the plate and providing a reference plane, said second opening adapted to receive a tool to be pre-set, an elongated gage bar having one end adapted to enter the circular cylindrical opening and its other end above the reference plane, a stop on the gage bar adjustable to vary the height of said other end above the reference plane, and threaded means to secure a gage head to the gage bar at said other end and including a threaded hole in the gage bar having an axis parallel to and spaced from the cylindrical axis of the circular cylindrical opening, to vary the orientation of the gage head with respect to a reference point on the gage bar.

References Cited in the file of this patent
UNITED STATES PATENTS

| | | |
|---|---|---|
| 255,123 | Starrett | Mar. 21, 1882 |
| 954,712 | Blood et al. | Apr. 12, 1910 |
| 1,487,092 | Dingel | Mar. 18, 1924 |
| 2,844,877 | Mogolis | July 29, 1958 |